(12) United States Patent
Khosrowpour et al.

(10) Patent No.: US 8,700,676 B2
(45) Date of Patent: Apr. 15, 2014

(54) SYSTEM AND METHOD FOR APPENDING METADATA TO OBJECTS

(75) Inventors: Farzad Khosrowpour, Pflugerville, TX (US); Kevin Marks, Round Rock, TX (US); Seth Feder, Austin, TX (US); Stephen Gouze Luning, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 326 days.

(21) Appl. No.: 12/757,462

(22) Filed: Apr. 9, 2010

(65) Prior Publication Data
US 2011/0252070 A1     Oct. 13, 2011

(51) Int. Cl.
*G06F 17/30*     (2006.01)

(52) U.S. Cl.
USPC ......................................... 707/802

(58) Field of Classification Search
USPC ......................................... 707/802
See application file for complete search history.

(56) References Cited

U.S. PATENT DOCUMENTS

| | | | |
|---|---|---|---|
| 5,717,919 A | 2/1998 | Kodavalla et al. | 395/608 |
| 2005/0108263 A1* | 5/2005 | Cabrera et al. | 707/100 |
| 2006/0230050 A1* | 10/2006 | Rehfeld et al. | 707/100 |
| 2007/0133710 A1 | 6/2007 | Khan et al. | 375/288 |
| 2007/0276778 A1* | 11/2007 | Klemm | 707/1 |
| 2007/0276860 A1* | 11/2007 | Klemm | 707/103 R |
| 2008/0040181 A1 | 2/2008 | Freire et al. | 705/8 |
| 2009/0112880 A1* | 4/2009 | Oliveira et al. | 707/10 |
| 2010/0030739 A1* | 2/2010 | Lanjewar et al. | 707/3 |
| 2011/0196827 A1* | 8/2011 | Zunger | 707/622 |

OTHER PUBLICATIONS

EMC Corporation, "EMC Centera Product Description Guide", May 2004, EMC, pp. 1-21.*

* cited by examiner

*Primary Examiner* — Ajay Bhatia
*Assistant Examiner* — Randall Burns
(74) *Attorney, Agent, or Firm* — Baker Botts L.L.P.

(57) ABSTRACT

Systems and methods for appending metadata to objects are disclosed. A method may include in response to an indication to add new metadata to an existing immutable data object stored at a first location on a storage resource: (a) writing a new data object to a second location on the storage resource, the new data object including the new metadata; (b) aliasing a first unique identifier associated with the existing immutable data object to a second unique identifier associated with the new data object; and (c) associating the second unique identifier to the second location.

6 Claims, 3 Drawing Sheets

| ID | LOC OR ALIAS | | |
|---|---|---|---|
| . | . | | |
| . | . | | |
| . | . | | |
| x | L(ABC) | L(ABC) | OBJECT 112 + METADATA 114 |
| . | . | | |
| . | . | | |
| . | . | | |

FIG. 4A

| ID | LOC OR ALIAS | | | |
|---|---|---|---|---|
| . | . | L(ABC) | OBJECT 112 + METADATA 114 | |
| . | . | | | |
| . | . | | o | |
| x | A(y) | | o | |
| . | . | | o | |
| . | . | | | |
| y | L(NEW) | L(NEW) | NEW METADATA | L(ABC) |
| . | . | | | |
| . | . | | | |

FIG. 4B

| ID | LOC OR ALIAS | | | |
|---|---|---|---|---|
| . | . | L(ABC) | <DELETED> | |
| . | . | | | |
| . | . | | o | |
| x | A(y) | | o | |
| . | . | | o | |
| . | . | | | |
| y | L(NEW) | L(NEW) | OBJECT 112 + METADATA 114 | NEW METADATA |
| . | . | | | |
| . | . | | | |

FIG. 4C

SYSTEM AND METHOD FOR APPENDING METADATA TO OBJECTS

TECHNICAL FIELD

The present disclosure relates in general to data storage, and more particularly to appending metadata to objects.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are often used to, or used in connection with, storage of data. Stored data may include one or more objects, wherein each object may include an item of data, including without limitation, a text file, a video file, an image file, an audio file, an executable file, any other type of file, or any portion thereof. In some instances, a particular object may be designated as immutable, meaning the particular object is not to be modified once created. An example of immutable data may be a digital file representing a patient x-ray—once the x-ray has been taken, the x-ray should not be modified in the patient's health records.

Various types of metadata may be associated with a particular object. Generally speaking, metadata is data about other data. With respect to the patient x-ray example above, metadata associated with the data object representing a patient x-ray may include the patient's name, address, age, date of birth, social security number, vital statistics, and/or other information.

Despite an object being immutable, certain metadata associated with an object may itself be mutable (e.g., metadata which can be modified). For example, in the example of a patient x-ray above, a patient's address, vital statistics, and other information may change over time. Accordingly, it may be desired to supplement the metadata with such new information without modifying the immutable object to which the metadata relates. In addition, it may also be desired to supplement existing metadata with the new metadata, so that historical metadata may be maintained (e.g., for auditing, compliance or other purposes).

In many traditional approaches, addition of metadata to existing immutable objects was accomplished by building indexes of pointers to metadata which are stored outside of the object data store. This leads to expense and complexity. In addition, such approaches may prevent users from building intelligent search and indexing capability across stored objects, because immutable data is split from its associated metadata.

In other traditional approaches for adding metadata to existing immutable objects, an application would need to read the existing object, append the new metadata to the object, and re-write the object back to the data store, in which case the object would likely be assigned a new unique identifier (e.g., a new universally unique identifier or UUID). The application would then need to create coherent write updates and associate the cached data across all instances on the distributed application. In addition, because the object is rewritten, there may be no assurance that the data has not changed.

SUMMARY

In accordance with the teachings of the present disclosure, the disadvantages and problems associated with of traditional approaches to appending metadata to associated immutable objects have been substantially reduced or eliminated.

In accordance with one embodiment of the present disclosure, a method for adding metadata to an immutable data object may be provided. The method may include in response to an indication to add new metadata to an existing immutable data object stored at a first location on a storage resource: (a) writing a new data object to a second location on the storage resource, the new data object including the new metadata; (b) aliasing a first unique identifier associated with the existing immutable data object to a second unique identifier associated with the new data object; and (c) associating the second unique identifier to the second location.

In accordance with another embodiment of the present disclosure, an article of manufacture may include a computer-readable medium and computer-executable instructions carried on the computer readable medium. The instructions may be executable by one or more processors and configured to cause the one or more processors to, in response to an indication to add new metadata to an existing immutable data object stored at a first location on a storage resource: (a) write a new data object to a second location on the storage resource, the new data object including the new metadata; (b) alias a first unique identifier associated with the existing immutable data object to a second unique identifier associated with the new data object; and (c) associate the second unique identifier to the second location.

In accordance with a further embodiment of the present disclosure, an information handling system may include one or more processors and computer readable media communicatively coupled to the one or more processors. The computer readable media may have stored thereon one or more instructions, the one or more instructions executable by one or more processors and configured to, when executed, cause the one or more processors to, in response to an indication to add new metadata to an existing immutable data object stored at a first location on a storage resource: (a) write a new data object to a second location on the storage resource, the new data object including the new metadata; (b) alias a first unique identifier associated with the existing immutable data object to a second unique identifier associated with the new data object; and (c) associate the second unique identifier to the second location.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 4A-4C graphically illustrate updates to a unique identifier table and locations of a storage resource in connection with execution of the methods depicted in FIGS. 2 and 3, in accordance with embodiments of the present disclosure.

DETAILED DESCRIPTION

Preferred embodiments and their advantages are best understood by reference to FIGS. 1 through 4C, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components or the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive, floppy disk, solid-state storage device), a sequential access storage device (e.g., a tape drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

Figure 1:
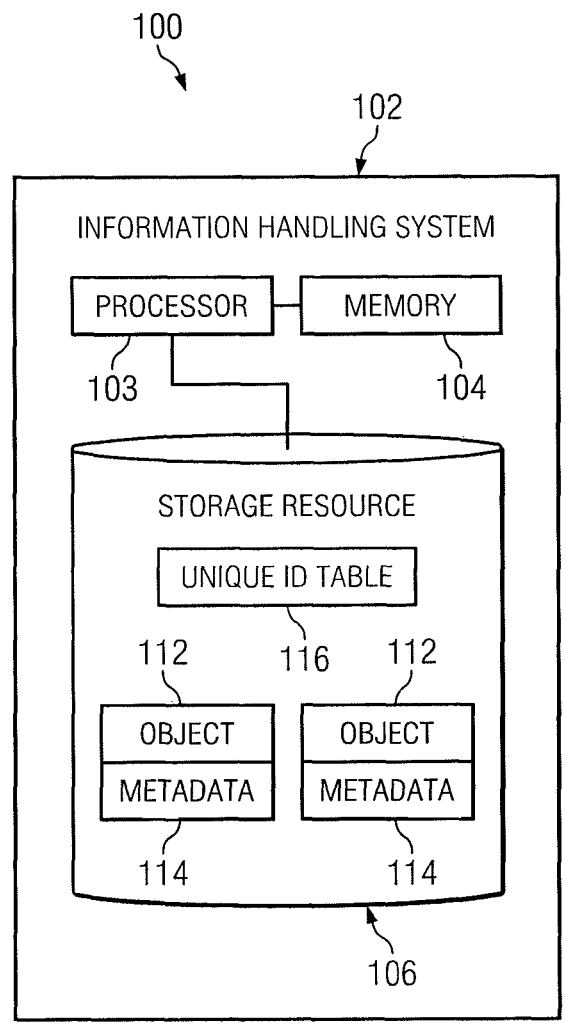
FIG. 1 illustrates a block diagram of an example system for data storage, in accordance with embodiments of the present disclosure.

FIG. 1 illustrates a block diagram of an example system 100 for data storage, in accordance with embodiments of the present disclosure. As depicted in FIG. 1, system 100 may comprise an information handling system 102.

Information handling system 102 may include a server, storage enclosure, and/or any suitable system, device or apparatus configured to store, maintain, and/or manage data objects. In certain embodiments, information handling system 102 may be part of a cluster of other information handling systems configured for storage of data. In these and other embodiments, information handling system 102 may be communicatively coupled to other information handling systems and may be configured to communicate to and/or receive data from such other information handling systems. As depicted in FIG. 1, information handling system 102 may comprise a processor 103, a memory 104 communicatively coupled to processor 103, and a storage resource 106 communicatively coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored and/or communicated by one or more of memory 104, storage resource 106, and/or another component of information handling system 102.

Memory 104 may be communicatively coupled to processor 103 and may comprise any system, device, or apparatus configured to retain program instructions or data for a period of time (e.g., computer-readable media). Memory 104 may comprise random access memory (RAM), electrically erasable programmable read-only memory (EEPROM), a PCM-CIA card, flash memory, magnetic storage, opto-magnetic storage, solid state storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disk drive, a compact disk drive, a solid state storage drive, a FLASH drive and/or any other suitable computer-readable medium.

As shown in FIG. 1, storage resource 106 may have stored thereon one or more objects 112, and a unique identifier table 116. An object 112 may include an item of data, including without limitation, a text file, a video file, an image file, an audio file, an executable file, any other type of file, or any portion thereof.

Each object 112 may have appended thereto metadata 114. Metadata 114 may comprise information regarding data stored in its associated object 112.

Unique identifier table 116 may comprise a table, database, file, or other data structure configured to relate a unique identifier associated with an object 112 (e.g., a universally unique identifier or "UUID") to a location (e.g., address) of storage resource 106 at which the object is stored.

Although system 100 is depicted as having one information handling system 102, system 100 may include any number of information handling systems 102 and/or other components. In addition, although information handling system 102 is depicted as having one processor 103, one memory 104, and one storage resource 106, information handling system 102 may include any number and/or combination of processors 103, memories 104, storage resources 106, and/or other components.

Figure 2:
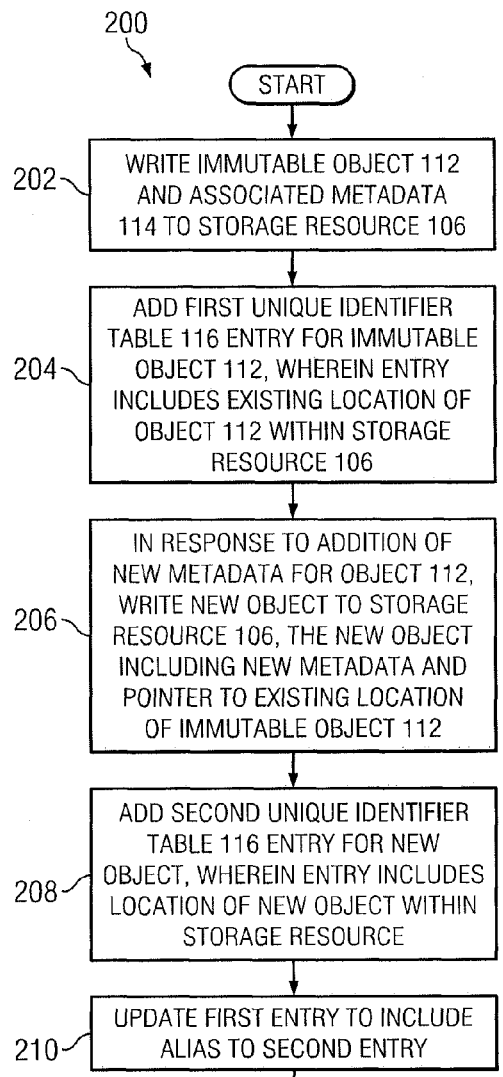
FIG. 2 illustrates a flow chart of an example method for adding metadata to an immutable object, in accordance with embodiments of the present disclosure.

FIG. 2 illustrates a flow chart of an example method 200 for adding metadata to an immutable object 112, in accordance with embodiments of the present disclosure. According to one or more embodiments, method 200 may begin at step 202. As noted above, teachings of the present disclosure may be implemented in a variety of configurations of system 100. As such, the initialization point for method 200 and the order of the steps 202-210 comprising method 200 may depend on the implementation chosen.

At step 202, an immutable object 112 and its associated metadata 114 may be written to storage resource 106. In some instances, such data may be written when the immutable object 112 is first created.

At step 204, a first entry may be added to unique identifier table 116 for immutable object 112 and its associated metadata 114. The first entry may relate a unique identifier for immutable object 112 (e.g., a UUID) to a location of storage resource 106 at which object 112 is stored, such as depicted in FIG. 4A, for example. As shown in the specific example of FIG. 4A, unique identifier "x" may be associated with a location "ABC" and location "ABC" of storage resource 106 may include the object 112 and its associated metadata 114.

At step 206, in response to an indication (e.g., request, command, message, and/or other indication) that additional metadata is to be added to object 112, a new object may be written to storage resource 106. The new object may include the new metadata and a pointer to the existing location of immutable object 112 and its associated metadata 114. In some embodiments, the new object may itself be an immutable object.

At step 208, a second entry may be added to unique identifier table 116 for the new object. The second entry may relate a unique identifier for the new object 112 (e.g., a UUID) to a location of storage resource 106 at which the new object is stored, such as depicted in FIG. 4B, for example. As shown in the specific example of FIG. 4B, unique identifier "y" may be associated with a location "NEW" and location "NEW" of storage resource 106 may include the new object including the new metadata and pointer to the existing object 112.

At step 210, the first entry of identifier table 116 may be updated to include an alias or pointer the second entry, such as depicted in FIG. 4B. In the specific example shown in FIG. 4B, unique identifier "x" may be modified to be associated with the alias "y", such that unique identifier "x" is aliased to the new object.

Although FIG. 2 discloses a particular number of steps to be taken with respect to method 200, method 200 may be executed with greater or lesser steps than those depicted in FIG. 2. For example, steps identical, analogous, or similar to steps 206-210 may be repeated in instances where further additional metadata is added in connection with the object 112. In addition, although FIG. 2 discloses a certain order of steps to be taken with respect to method 200, the steps comprising method 200 may be completed in any suitable order.

Method 200 may be implemented using system 100 or any other system operable to implement method 200. In certain embodiments, method 200 may be implemented partially or fully in software and/or firmware embodied in computer-readable media (e.g., a program of instructions stored on storage resource 106 capable of being executed by processor 103).

Figure 3:
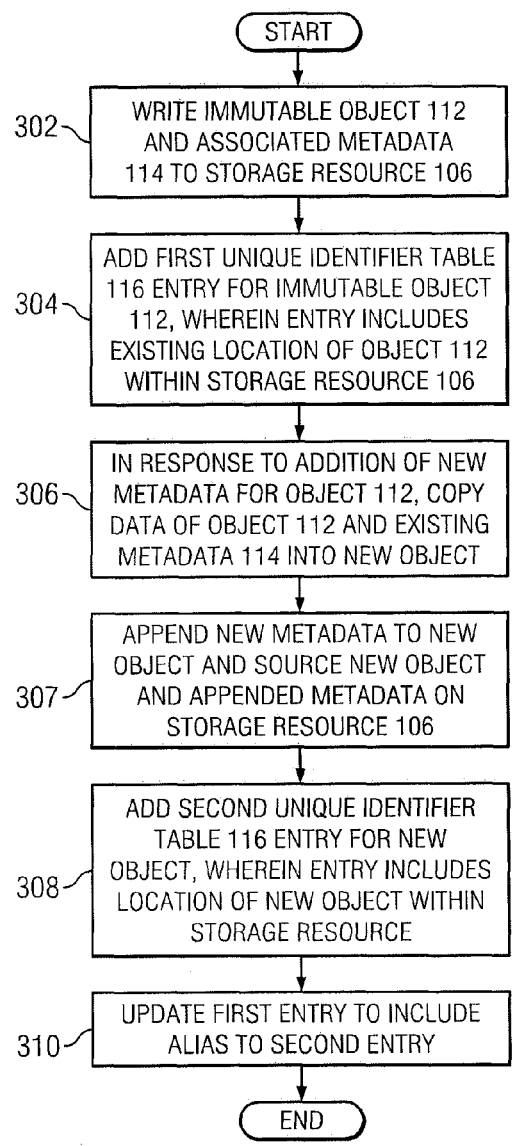
FIG. 3 illustrates a flow chart of another example method for adding metadata to an immutable object, in accordance with embodiments of the present disclosure.

FIG. 3 illustrates a flow chart of an example method 300 for adding metadata to an immutable object 112, in accordance with embodiments of the present disclosure. According to one or more embodiments, method 300 may begin at step 302. As noted above, teachings of the present disclosure may be implemented in a variety of configurations of system 100. As such, the initialization point for method 300 and the order of the steps 302-310 comprising method 300 may depend on the implementation chosen.

At step 302, an immutable object 112 and its associated metadata 114 may be written to storage resource 106. In some instances, such data may be written when the immutable object 112 is first created.

At step 304, a first entry may be added to unique identifier table 116 for immutable object 112 and its associated metadata 114. The first entry may relate a unique identifier for immutable object 112 (e.g., a UUID) to a location of storage resource 106 at which object 112 is stored, such as depicted in FIG. 4A, for example. As shown in the specific example of FIG. 4A, unique identifier "x" may be associated with a location "ABC" and location "ABC" of storage resource 106 may include the object 112 and its associated metadata 114.

At step 306, in response to an indication (e.g., request, command, message, and/or other indication) that additional metadata is to be added to object 112, the data of object 112 and its existing metadata 114 may be copied into a new object.

At step 307, the new metadata associated with object 112 may be appended to the new object. Such new object, including the appended new metadata may be written to storage resource 106. In some embodiments, the new object may itself be an immutable object.

At step 308, a second entry may be added to unique identifier table 116 for the new object. The second entry may relate a unique identifier for the new object 112 (e.g., a UUID) to a location of storage resource 106 at which the new object is stored, such as depicted in FIG. 4C, for example. As shown in the specific example of FIG. 4C, unique identifier "y" may be associated with a location "NEW" and location "NEW" of storage resource 106 may include the new object including the new metadata and pointer to the existing object 112.

At step 310, the first entry of identifier table 116 may be updated to include an alias or pointer the second entry, such as depicted in FIG. 4C. In the specific example shown in FIG. 4C, unique identifier "x" may be modified to be associated with the alias "y", such that unique identifier "x" is aliased to the new object.

Although FIG. 3 discloses a particular number of steps to be taken with respect to method 300, method 300 may be executed with greater or lesser steps than those depicted in FIG. 3. For example, steps identical, analogous, or similar to steps 306-310 may be repeated in instances where further additional metadata is added in connection with the object 112. In addition, although FIG. 3 discloses a certain order of steps to be taken with respect to method 300, the steps comprising method 300 may be completed in any suitable order.

Method 300 may be implemented using system 100 or any other system operable to implement method 300. In certain embodiments, method 300 may be implemented partially or fully in software and/or firmware embodied in computer-readable media (e.g., a program of instructions stored on storage resource 106 capable of being executed by processor 103).

Using the methods and systems disclosed herein, problems associated with conventional approaches to appending metadata to immutable objects may be reduced or eliminated. For example, the methods and systems disclosed may allow metadata to be added to existing immutable objects "in-place" within a storage resource, which may reduce or eliminate the need for read, write and append operations often used in traditional approaches. Accordingly, metadata, including later-added metadata, may be maintained on the same storage device as associated immutable data. Such maintenance of metadata with its associated immutable data may improve data search functionality or reduce data search complexity, as compared with traditional approaches.

In addition, the approaches disclosed herein allow metadata to be added to an immutable data object without the need to change a unique identifier of the data object, and may also allow the immutable data and all of its metadata (including later-added metadata) to be accessed by reference to a single unique identifier.

The advantages described above also increase reliability of immutable data, as compared with traditional approaches, as the "in-place" addition of metadata may increase assurance that data designated as immutable has not been changed, and may also allow a historical record, within the storage resources including the immutable data, of metadata additions to the immutable data.

Although the present disclosure has been described in detail, it should be understood that various changes, substitutions, and alterations can be made hereto without departing from the spirit and the scope of the disclosure as defined by the appended claims.

What is claimed is:

1. A method for adding metadata to an immutable data object, comprising:
   in response to an indication to add new metadata to an existing immutable data object stored at a first location on a storage resource:
      copying the existing immutable data object and existing metadata of the existing immutable data object;
      writing the copied existing immutable data object, the copied existing metadata, and the new metadata as a new data object to a second location on the storage resource, wherein the new data object is an immutable object including the copied existing immutable data object, the copied existing metadata, and the new metadata;
      aliasing a first unique identifier associated with the existing immutable data object to a second unique identifier associated with the new data object;
      associating the second unique identifier to the second location; and
      deleting the existing immutable data object and the existing metadata of the existing immutable data object from the storage resource.

2. A method according to claim 1, wherein aliasing a first unique identifier associated with the existing immutable data object to a second unique identifier associated with the new data object comprises updating a first entry in an identifier table to include a pointer to a second entry in the identifier table, the first entry being related to the first unique identifier and the second entry being related to the second unique identifier.

3. An article of manufacture comprising:
   a non-transitory computer-readable medium; and
   computer-executable instructions carried on the computer readable medium, the instructions executable by one or more processors and configured to cause the one or more processors to, in response to an indication to add new metadata to an existing immutable data object stored at a first location on a storage resource:
      copy the existing immutable data object and existing metadata of the existing immutable data object;
      write the copied existing immutable data object, the copied existing metadata, and the new metadata as a new data object to a second location on the storage resource, wherein the new data object is an immutable object including the copied existing immutable data object, the copied existing metadata, and the new metadata;
      alias a first unique identifier associated with the existing immutable data object to a second unique identifier associated with the new data object;
      associate the second unique identifier to the second location; and
      delete the existing immutable data object and the existing metadata of the existing immutable data object from the storage resource.

4. An article of manufacture according to claim 3, wherein aliasing a first unique identifier associated with the existing immutable data object to a second unique identifier associated with the new data object comprises-updating a first entry in an identifier table to include a pointer to a second entry in the identifier table, the first entry being related to the first unique identifier and the second entry being related to the second unique identifier.

5. An information handling system, comprising:
   one or more processors; and
   computer readable media communicatively coupled to the one or more processors, the computer readable media having stored thereon one or more instructions, the one or more instructions executable by one or more processors and configured to, when executed, cause the one or more processors to, in response to an indication to add new metadata to an existing immutable data object stored at a first location on a storage resource:
      copy the existing immutable data object and existing metadata of the existing immutable data object;
      write the copied existing immutable data object, the copied existing metadata, and the new metadata as a new data object to a second location on the storage resource, wherein the new data object is an immutable object including the copied existing immutable data object, the copied existing metadata, and the new metadata;
      alias a first unique identifier associated with the existing immutable data object to a second unique identifier associated with the new data object;
      associate the second unique identifier to the second location; and
      delete the existing immutable data object and the existing metadata of the existing immutable data object from the storage resource.

6. An information handling system according to claim 5, wherein aliasing a first unique identifier associated with the existing immutable data object to a second unique identifier associated with the new data object comprises updating a first entry in an identifier table to include a pointer to a second entry in the identifier table, the first entry being related to the first unique identifier and the second entry being related to the second unique identifier.

* * * * *